Feb. 2, 1943.                T. G. MYERS                2,309,707
              SEALED SUBMERSIBLE STRUCTURE
              Filed Nov. 22, 1937        3 Sheets-Sheet 1
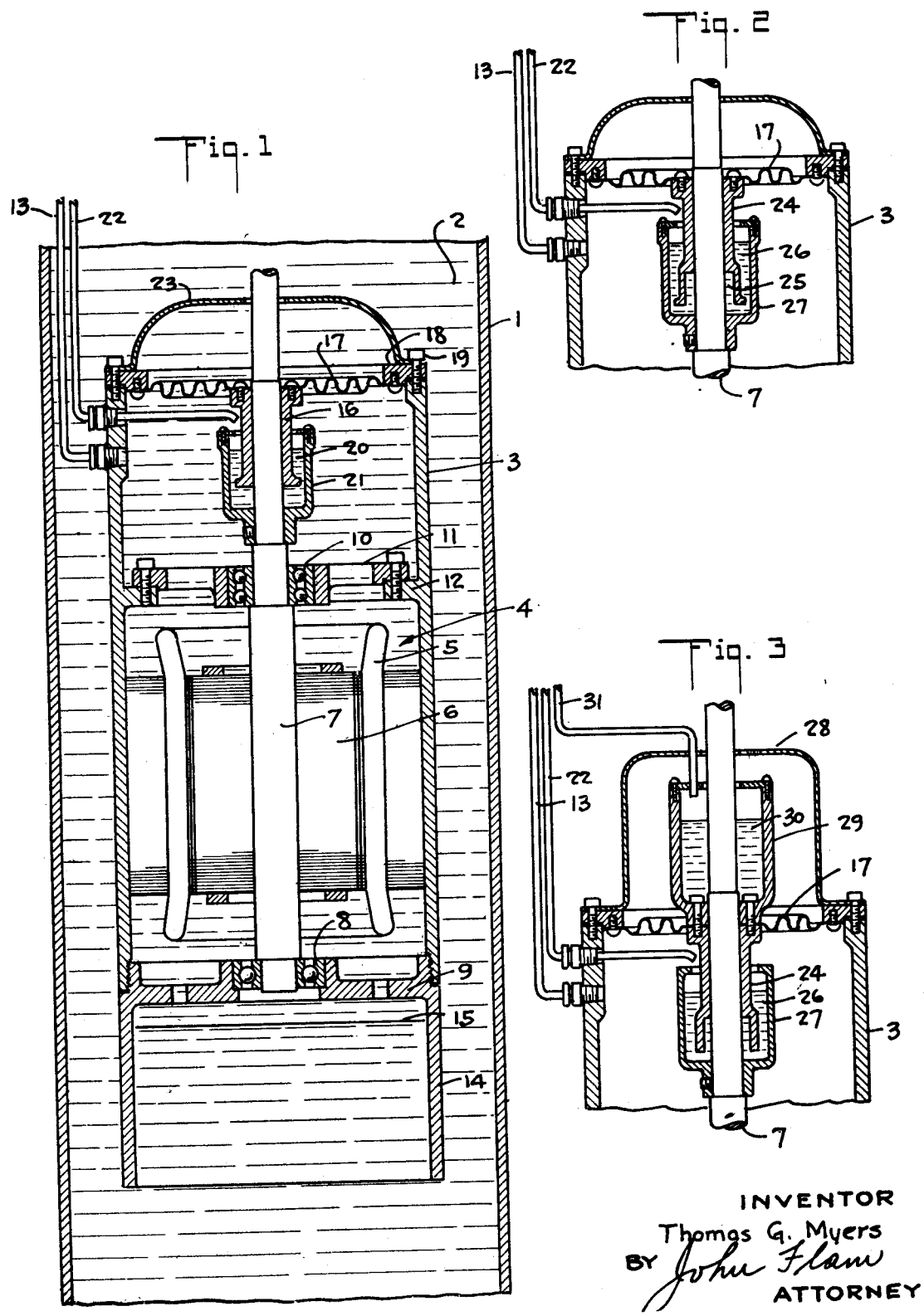
INVENTOR
Thomas G. Myers
BY John Flam
ATTORNEY

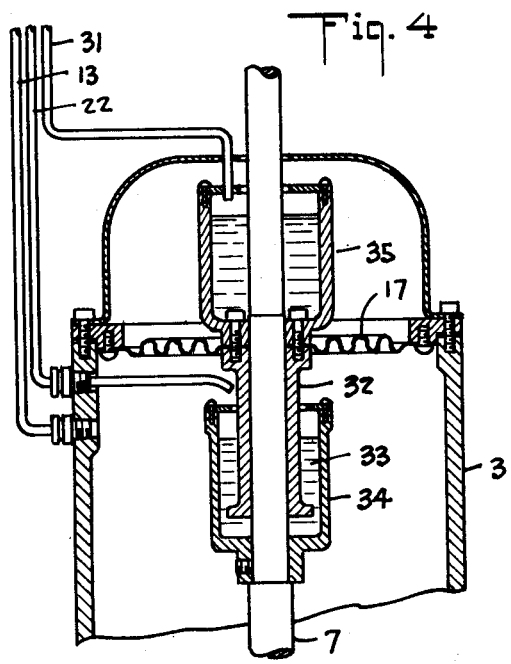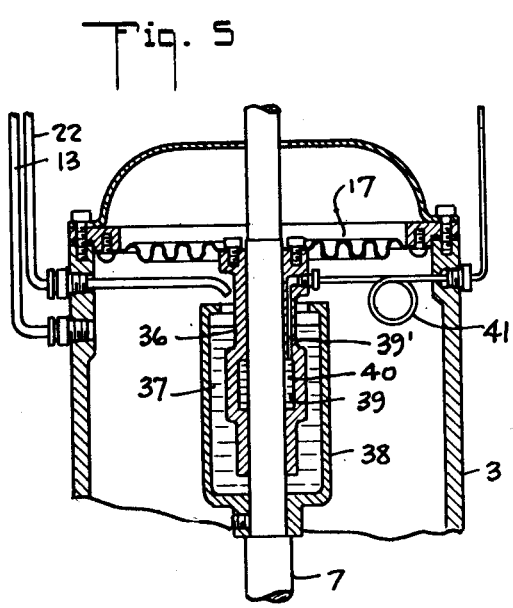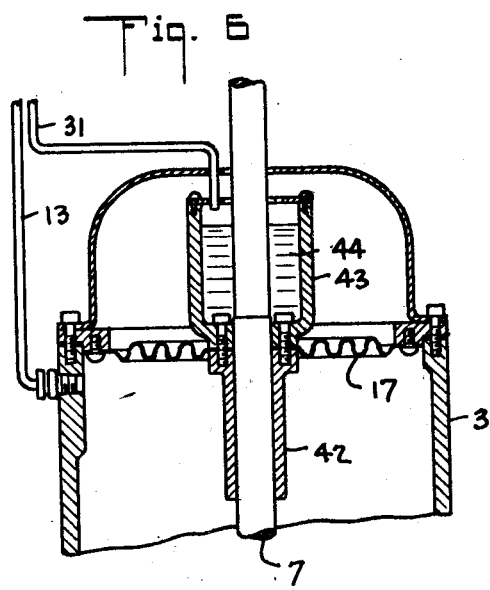

Feb. 2, 1943.　　　T. G. MYERS　　　2,309,707
SEALED SUBMERSIBLE STRUCTURE
Filed Nov. 22, 1937　　　3 Sheets-Sheet 3
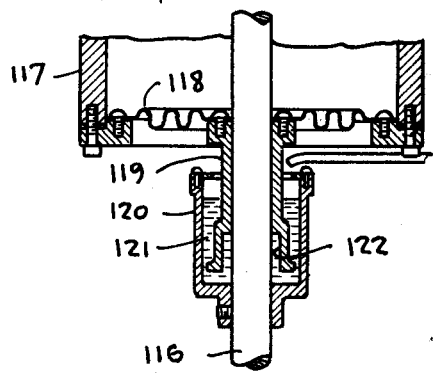
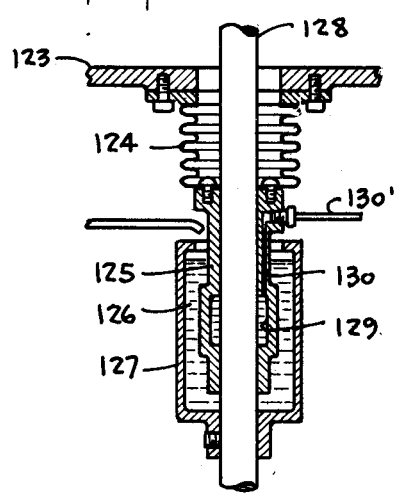
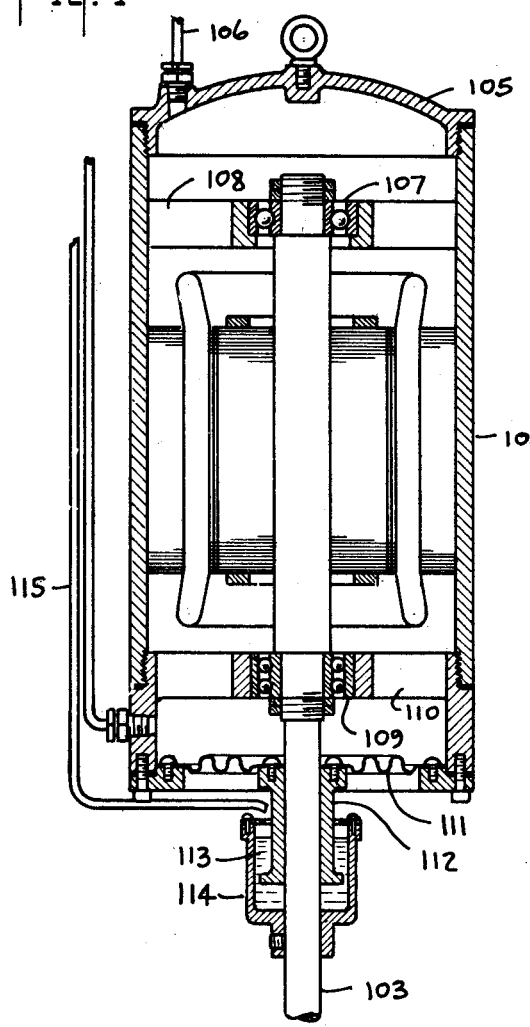
INVENTOR
Thomas G. Myers
BY John Flam
ATTORNEY Patented Feb. 2, 1943

2,309,707

UNITED STATES PATENT OFFICE 2,309,707

SEALED SUBMERSIBLE STRUCTURE

Thomas G. Myers, Los Angeles, Calif., assignor to U. S. Electrical Motors, Inc., Los Angeles, Calif., a corporation of California Application November 22, 1937, Serial No. 175,896

18 Claims. (Cl. 172—36)

This invention relates to submersible structures, such as electrical motors that are adapted to operate in a well, for driving a pump therein.

The problems met with in such installations have been described in a prior application filed in the name of Thomas G. Myers on November 8, 1937, under Serial Number 173,434, and entitled "Submersible structure."

In general such submersible structures utilize a casing in which the motor parts are enclosed. The well liquid is excluded at least from that part of the casing in which the motor windings and the rotary structures are located. As it is essential that the motor shaft extend out of the casing for connection to the pump, a seal must be provided around the shaft to exclude passage of well liquid into the casing along the cylindrical shaft surface.

In the prior application heretofore referred to, several forms of such seals are described, in which there is utilized a heavy liquid, such as mercury, to overlie relatively rotary sealing surfaces, and thereby to operate as a supplemental seal.

It is one of the objects of this invention to provide a sealing structure in which the sealing liquid and the sealing surfaces are so arranged that the seal remains undisturbed even upon material misalinement or transverse motion of the shaft.

In this connection, it is another object of the invention to provide a simple and effective device for permitting at least limited freedom of flexure or motion of the shaft without detriment to other parts of the mechanism; and that will maintain the seal intact even upon vibration of the shaft, due to any cause, such as wear.

These objects are attained in general by providing contacting relatively movable cylindrical surfaces, of sufficient axial length and with sufficiently close tolerances to form an acceptable seal by itself; and yet permitting material departure of alignment in other respects. This latter requirement is fulfilled in this invention by the provision of yielding or conformable elements, such as diaphragms, metal bellows, or comfortable supports, such as of fabric or the like.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a view, mainly in section, of a submersible structure embodying the invention, shown as immersed in a well;

Fig. 2 is a fragmentary sectional view illustrating a modified form of the seal that may be used in place of that shown in Fig. 1;

Figs. 3 to 6 inclusive are views similar to Fig. 2, but showing modifications of the invention;

Fig. 7 is a view, mainly in section, of a submersible structure in which the rotary shaft extends downwardly out of the casing, and in which the invention is embodied; and Figs. 8 and 9 are fragmentary views similar to Fig. 7 and illustrating modifications in the form of seal.

In Fig. 1 there is shown a well having the well casing 1, and shown as having disposed within it the well liquid 2. This well liquid is usually water.

A submersible structure, including the casing 3, is intended to be submerged in the well liquid. This submersible structure is shown in the present instance as including a squirrel cage induction motor 4 having primary windings 5, a rotor 6; and a shaft 7. The shaft 7 is shown in this instance as projecting upwardly out of the casing 3 for direct connection to a pump (not shown) for pumping the well liquid 2 out of the well.

The shaft 7 is intended to be rotatably supported by appropriate bearing structures located within the casing 3. The casing is so arranged that well liquid is excluded from all rotary parts and from the windings of the motor. The manner in which this is accomplished will be described hereinafter.

The support for the shaft 7 may include a thrust ball bearing structure 8 supported in an apertured wall 9 extending across the bottom of the casing 3. Adjacent the upper end of the casing the ball bearing structure 10 may be provided for the shaft; the bearing is supported as by a spider 11 fastened to the flange 12, shown as formed integrally with the casing 3.

This part of the casing 3 which houses the motor 4 and the bearing structures 8 and 10, is intended to be filled with a neutral liquid or lubricant, such as oil, or with air. For example, an oil or air supply pipe line 13 may connect the interior of the casing 3 with a source of liquid or gas at the top of the well. Provisions may be added, if desired, to prevent reverse flow of the filling from the casing through the pipe 13.

Ordinarily it is preferable to maintain the fluid pressures within and outside of the casing 3 at substantially equal values, or to maintain the pressure within the casing 3 slightly higher than the external pressure of the well liquid 2. This pressure equalization may be provided by any appropriate pressure balancing means operating upon the source of supply for the casing filling. However, in the present instance, as representative of means for securing this pressure balance, use is made of a depending open portion 14 of the casing 3. Within this portion the well liquid is intended to rise, its upper level 15 being intended at all times to be substantially below the lowermost bearing structure 8. The surface of contact 15 with the casing filling serves to transmit well pressure to the interior of the casing 3.

It is obvious that the well liquid 2 must be excluded from entering the casing 3 around the shaft 7 where it emerges from the casing 3. For this purpose use is made of a sealing device which includes an elongated non-rotary sealing member or bushing 16. This bushing 16 is shown as directly contacting the cylindrical surface of the shaft 7 where it extends from the casing 3. This contact is purposely made very close, the tolerance between member 16 and shaft 7 being one-half of one one-thousandth of an inch or less. Accordingly there is a material resistance to the flow of liquid through the very narrow passage formed between the closely fitting sleeve 16 and shaft 7.

The sleeve 16 must be supported by the casing 3. In the present instance this supporting means includes a flexible corrugated diaphragm 17 which extends across the top of the casing 3 and forms an upper fluid tight wall thereon. For this purpose this diaphragm 17 is provided with an annular rim 18, fastened as by bolts 19 to the upper edge of the casing body. The corrugations in the diaphragm 17 make this diaphragm sufficiently yielding or flexible for a purpose to be later described. This diaphragm may be made of any appropriate material capable of withstanding the mechanical stresses imposed thereon, although suitable metal of acceptable durability is preferred.

The flexible member 17 serves an important purpose in conjunction with the close fit between the shaft 7 and the sleeve 16. As the shaft 7 is placed under load, it is very apt to be whipped or vibrated out of alignment with the true vertical axis of the casing 3. Were it not for the diaphragm 17, this whipping would cause harmful vibration of the entire mechanism, and a tendency to destroy the seal. The misalignment is permitted by the flexing of diaphragm 17 without any danger of the transmission of harmful vibrations to other parts of the mechanism, and without disturbing the proper axial alignment between shaft 7 and sleeve 16.

Although in some instances the seal provided by the closely contacting member 16 is sufficient, yet it is preferred to supplement this seal by utilizing a heavy sealing liquid 20, into which the lower end of member 16 extends. This sealing liquid 20 may be mercury, carbon tetrachloride, carbon disulphide, or the like, and may be accommodated in a rotary cup 21 carried by the shaft 7. A filler pipe 22 is indicated as leading upwardly to a source of supply for the sealing liquid. In this way the sealing liquid can be replenished whenever desired, from the top of the well.

The diaphragm 17 also serves to some extent as a pressure balancing medium from the inside to the outside of the casing 3. Its main function, however, is to permit misalignment of the shaft 17, as heretofore stated, without disturbing the seal, and without transmitting harmful vibrations to other parts of the apparatus.

In order generally to exclude sand that may be suspended in the well liquid 2, from around the top shaft 7, a supplemental guard flange 23 is indicated. This may be held as by bolts 19 over the diaphragm 17.

The liquid seal 20 overlying the lower end of the non-rotary member 16, serves as a supplemental seal. Well liquid, in order to enter the casing 3, must not only pass between shaft 7 and member 16, but must also pass through the sealing liquid 20. Since this sealing liquid has considerable surface tension, it cannot escape through the extremely narrow passage formed between the two contacting members 7 and 16.

In the form of the invention illustrated in Fig. 2, the diaphragm 17 is shown as supporting a sleeve or non-rotary member 24, that is provided at its lower end with an annular recess 25. This annular recess forms an annular space around the shaft 7. Accordingly the sealing liquid 26 in the rotary cup 27 extends into this recess and provides an additional sealing effect. In other respects the structure of this form of submersible device may be the same as that shown in Fig. 1.

In the form of the invention illustrated in Fig. 3, a further supplemental sealing effect is provided. Here the diaphragm 17 is shown as having supported above it the shield 28. The sleeve 24 and rotary cup 27 with its sealing liquid 26 are shown as substantially the same as in Fig. 2.

However, in this form of the invention, a stationary cup 29 is indicated, supported exteriorly of the casing 3 and above the diaphragm 17. This cup can also be filled with a heavy sealing liquid 30, such as mercury, carbon tetrachloride, or the like. It is indicated in the present instance as carbon tetrachloride. It serves as an additional sealing means supplementing the sealing effect of the close fitting tubular member 24 and the liquid seal 26. This stationary cup 29 may be replenished with sealing liquid from the top of the well, as through a conduit 31.

The idea of having a pair of cups, one within and one outside of the fluid tight casing 3, is also shown in the form of the invention illustrated in Fig. 4. In this case the elongated close fitting sleeve 32 is carried, as before, by the flexible diaphragm 17 and it extends into the heavy sealing liquid 33, which may be mercury. This sealing liquid may be accommodated in a rotary cup 34 located within the casing 3.

Above the diaphragm 17 and exterior of the casing there is indicated the stationary cup 35, also carried by the diaphragm 17. This may be filled with carbon tetrachloride or mercury. In other respects the structure may be the same as that disclosed in Fig. 1.

In the form of the invention illustrated in Fig. 5, the casing 3 is again shown as closed at its upper end by the flexible diaphragm 17. The shaft 7 in this case is in close fitting contact with a non-rotary sealing member 36. The lower end of this member 36 is disposed within the heavy sealing liquid 37, which may be mercury or the like. This sealing liquid is shown, as before, as accommodated in a rotary cup 38 carried by the shaft 7.

In this form of the invention, the member 36 is provided with an intermediate annular recess 39 forming an annular space around the shaft 7. This annular space is likewise adapted to be filled with a sealing liquid 40, such as mercury or the like. A port 39' formed in member 36 extends upwardly from recess 39 and has a flexible tube 41 connected with it. This tube leads out of the casing and provides a means of filling the recess with liquid 40. Means to maintain pressure on this liquid, or means to prevent return flow, or both, may be provided in connection with tube 41, if desired.

In this form of the invention, the well liquid, in order to enter into the casing 3, must find its way first downwardly between the very closely fitting sleeve 36 and shaft 7, and then past the liquid seal 40, then again between the very closely fitting parts 7 and 36, and finally through the sealing liquid 37.

In some instances it may be unnecessary to provide a supplemental sealing liquid within the casing 3, so long as there is a sealing liquid arranged externally of the diaphragm 17. Such a form is illustrated in Fig. 6. In this form of the invention, the close fitting non-rotary sealing member 42 is merely surrounded by the fluid or liquid filling the casing 3, and it is flexibly supported by the diaphragm 17. This diaphragm 17 also carries the stationary exterior cup 43 which surrounds the shaft 7 and which may be filled with the sealing liquid 44. This sealing liquid, as before, may be mercury or the like which is heavier than the well liquid.

It is not essential that the filling of the submersible casing be limited to a neutral liquid, such as oil, that is lighter than well liquid. The neutral liquid may be carbon tetrachloride, which is heavier than the well liquid and which is inert.

It is not essential, however, that in the forms of the invention heretofore discussed, the shaft extend upwardly out of the casing. In the form of the invention shown in Fig. 7, the shaft 103 is shown as extending downwardly out of the casing 104. This casing 104 is provided with an upper fluid tight cover 105 and with a filler pipe 106. A thrust ball bearing structure 107 may be provided for the upper end of shaft 103 on the spider 108 integral with the casing 104. Adjacent the lower end of the shaft there may be provided a ball bearing structure 109, supported in the spider 110, also shown as forming a part of the casing 104.

The lower end of casing 104 is shown as closed by the flexible corrugated diaphragm 111, similar in construction to the diaphragm 17 of Fig. 1. This diaphragm also supports the elongated non-rotary sealing member 112, which has a very close fit upon the shaft 103, and therefore serves as a mechanical seal. If preferred, the lower end of the non-rotary member 112 may be immersed in a supplemental liquid seal 113, carried in the rotary cup member 114. This rotary cup member 114 is shown as fastened directly to the shaft 103. The liquid seal 113 may be mercury or the like, and may be filled, if desired, through a filler tube 115 extending to the top of the well.

As in some of the other forms illustrated, the vibration of shaft 103, or its deflection, is permitted without transmitting harmful vibrations to other parts of the mechanism, and without harming the seal. This is secured by virtue of the flexible or yielding support 111 for the closely fitting sleeve 112.

In another form of the invention, illustrated in Fig. 8, the shaft 116 again extends downwardly out of the casing 117. The flexible diaphragm 118 closes the bottom of the casing and supports the non-rotary sealing member 119. This sealing member, as before, is adapted to be extended into the heavy sealing liquid 120. However, in this case the lower end of the non-rotary member 119 is provided with a flange 121 forming an annular space 122 around the shaft 116. In this way the heavy sealing liquid 120 may extend upwardly into the space 122 to form a better supplemental seal.

In another form of the invention illustrated in Fig. 9, the bottom wall 123 of the submersible casing is shown as supporting the metal bellows 124. This metal bellows in turn supports the non-rotary sealing member 125. This non-rotary sealing member is intended to be immersed within the heavy sealing liquid 126, accommodated in a rotary cup 127. In this form of the invention, the shaft 128 forms, with an intermediate part of the sleeve 125, an annular chamber 129. This annular chamber may be filled with a heavy sealing liquid, as through the port 130 and connecting tube 130'. Means for maintaining this liquid under pressure may be provided, if desired.

The two liquid seals 126 and 129 greatly supplement the sealing effect of the tightly fitting members 125 and 128. Due to the provision of the metal bellows 124, vibration of shaft 128 is again permitted without seriously affecting the seal, and without imparting vibration to other parts of the mechanism.

What is claimed is:

1. In a submersible structure adapted to be submerged in well liquid, a casing, an electric motor in the casing, said motor having a bearing structure within the casing, a closure for one end of the casing comprising a diaphragm, a shaft driven by the said motor and extending out of the casing and through said diaphragm, and a seal between the shaft and the diaphragm for rendering said casing fluid tight, including a non-rotary member secured to the diaphragm and having an extended cylindrical area of contact with the shaft, said shaft being unrestrained between said seal and said bearing structure.

2. In a submersible structure adapted to be submerged in well liquid, a casing, a rotary structure, including a shaft extending out of the casing, a bearing structure for the shaft in the casing, and a seal between the casing and said rotary structure including, a non-rotary member having, with the rotary structure, an extended cylindrical area of contact coaxial with the shaft, a flexible support for the non-rotary member, and joined to the casing, a rotary cup carried by the shaft, and sealing liquid in the cup, said sealing liquid being heavier than the well liquid and surrounding and freely contacting the shaft, said non-rotary member extending into said liquid, said shaft being unrestrained between said seal and said bearing structure.

3. In a submersible structure adapted to be submerged in well liquid, a casing, a rotary structure, including a shaft extending out of the casing, a bearing structure for the shaft in the casing, and a seal between the casing and said rotary structure including, a non-rotary member having, with the rotary structure, an extended cylindrical area of contact coaxial with the shaft, means yieldingly supporting said non-rotary member by the aid of the casing, a rotary cup carried by the shaft, and sealing liquid in the cup, said sealing liquid being heavier than the well liquid and surrounding and freely contacting the shaft, said non-rotary member extending into said liquid, said shaft being unrestrained between said seal and said bearing structure.

4. In a submersible structure adapted to be submerged in well liquid, a casing, a shaft extending out of the casing, a non-rotary member having an extended cylindrical area of contact with the shaft, said non-rotary member and shaft defining a recess adjacent the area of contact and arranged to form an annular space around the shaft, a rotary cup carried by the shaft and into which the lower end of said non-rotary member extends, and sealing liquid in the cup, said liquid being heavier than the well liquid, said liquid extending into and substantially entirely filling the annular space and contacting the shaft.

5. In a submersible structure adapted to be submerged in well liquid, a casing, a rotary shaft extending out of the casing, a seal between said casing and said shaft comprising: a non-rotary member contacting with the shaft, a heavy sealing liquid disposed within the casing and at least partly overlying the area of contact, and means forming a body of heavy sealing liquid exterior of the casing and surrounding and contacting the shaft adjacent the surface defining one end of the area of contact.

6. In a submersible structure adapted to be submerged in well liquid, a casing, a rotary shaft extending out of the casing and a seal between the casing and the shaft comprising, a non-rotary member contacting the shaft, said member being supported by the casing, and means forming a pair of bodies of heavy sealing liquid surrounding and contacting the shaft adjacent the surfaces defining the opposite ends of the area of contact, one of said bodies of liquid being disposed within the casing.

7. In a submersible structure adapted to be submerged in well liquid, a casing, a rotary shaft extending out of the casing, a seal between said casing and said shaft comprising: a non-rotary member contacting with the shaft, said non-rotary member being supported by and extending into the casing, a rotary cup carried by the shaft adjacent the end of said non-rotary member, a heavy sealing liquid in the cup, a non-rotary cup surrounding the shaft supported by, and exterior, of the casing, and a second heavy sealing liquid in said non-rotary cup.

8. In a submersible structure adapted to be submerged in well liquid, a casing, a rotary shaft extending out of the casing, a seal between said casing and said shaft comprising: a non-rotary member contacting with the shaft, a heavy sealing liquid disposed within the casing and at least partly overlying the area of contact, means forming a body of heavy sealing liquid exterior of the casing and surrounding and contacting the shaft adjacent the surface defining one end of the area of contact, and a flexible member in fluid tight contact with the casing secured to and supporting said non-rotary member.

9. In a submersible structure adapted to be submerged in well liquid, a casing, a rotary shaft extending out of the casing and a seal between the casing and the shaft comprising, a non-rotary member contacting the shaft, said member being supported by the casing, and means forming a pair of bodies of heavy sealing liquid surrounding and contacting the shaft adjacent the surfaces defining the opposite ends of the area of contact, one of said sealing liquids being mercury, the other being carbon tetrachloride.

10. In a submersible structure adapted to be submerged in well liquid, a casing, a rotary shaft extending out of the casing, a seal between said casing and said shaft comprising: a non-rotary member contacting with the shaft, said non-rotary member being supported by and extending into the casing, a rotary cup carried by the shaft adjacent the end of said non-rotary member, a heavy sealing liquid in the cup, a non-rotary cup surrounding the shaft supported by, and exterior of the casing, and a second heavy sealing liquid in said non-rotary cup, the non-rotary contacting member having a recess forming an annular space around the shaft at the lower end of said contacting member, into which recess extends the heavy sealing liquid supported in the rotary cup.

11. In a submersible structure adapted to be submerged in well liquid, a casing, a rotary shaft extending out of the casing, and a seal between said casing and said shaft comprising, a non-rotary member contacting with the shaft and supported by the casing, and means forming a pair of bodies of mercury disposed respectively adjacent opposite ends of the area of contact.

12. In a submersible structure adapted to be submerged in well liquid, a casing, a shaft extending out of the casing, a non-rotary member having a close cylindrical elongated area of contact with the shaft and supported by the casing, said member forming a recess intermediate its ends and around the shaft, a sealing liquid in the recess, and a body of sealing liquid overlapping the area of contact of the non-rotary member and the shaft.

13. In a submersible structure adapted to be submerged in well liquid, a casing, a shaft extending out of the casing, a non-rotary member surrounding and closely contacting the shaft, means for yieldingly supporting said member by the casing, said member forming a recess intermediate its ends and around the shaft, a sealing liquid in the recess, and a body of sealing liquid overlapping the area of contact of the non-rotary member and the shaft.

14. In a submersible structure adapted to be submerged in well liquid, a casing, a shaft extending out of the casing, a seal between said casing and said shaft comprising: a non-rotary member in close contact with the shaft where it extends out of the casing, a yielding support for said member and attached to one end thereof, so that said member extends in one direction from the support, and means forming a body of sealing liquid surrounding and contacting the shaft, and extending in a direction from the yielding support opposite to the direction of the non-rotary member.

15. In a submersible structure adapted to be submerged in well liquid, a casing, a shaft extending downwardly out of the casing, a non-rotary member in contact with the cylindrical surface of the shaft where it extends out of the casing, said cylindrical contacting surface being elongated, means yieldingly supporting said non-rotary member at the bottom of the casing, a rotary cup carried by the shaft into which the non-rotary member extends, and a heavy sealing liquid in the cup.

16. In a submersible structure adapted to be submerged in well liquid, a casing, a shaft extending downwardly out of the casing, a non-rotary member in contact with the cylindrical surface of the shaft where it extends out of the casing, said cylindrical contacting surface being elongated, means yieldingly supporting said non-rotary member at the bottom of the casing, a rotary cup carried by the shaft into which the non-rotary member extends, a heavy sealing liquid in the cup, said non-rotary member having a recess intermediate its ends, forming an annular space around the shaft, and a second body of sealing liquid in said space.

17. In a submersible structure adapted to be submerged in well liquid, a tubular casing, a closure for one end of the casing comprising a flexible, substantially flat diaphragm extending substantially entirely across said end, a shaft extending out of the casing and through said closure, and a seal between said shaft and the closure comprising a non-rotary member carried by said diaphragm and contacting with the shaft, and means forming a pair of bodies of heavy sealing liquid surrounding and contacting the shaft adjacent the surfaces defining the opposite ends of said surface of contact.

18. In a submersible structure adapted to be submerged in well liquid, a casing, a closure for one end of the casing comprising a diaphragm extending across said end, a shaft extending out of the casing and through said closure, a bearing structure for the shaft in said casing, and a seal between said shaft and the closure comprising a non-rotary member carried by said diaphragm and contacting with the shaft, a rotary cup carried by the shaft, and a heavy sealing liquid in the cup surrounding and contacting the shaft, said non-rotary member extending into said liquid, said shaft being unrestrained between said seal and said bearing structure.

THOMAS G. MYERS.